(12) United States Patent
Araki et al.

(10) Patent No.: US 7,845,216 B2
(45) Date of Patent: Dec. 7, 2010

(54) INSTANTANEOUS FLOW RATE MEASUREMENT INSTRUMENT OF GASEOUS FUEL INJECTOR

(75) Inventors: Mikiya Araki, Gunma (JP); Seiichi Shiga, Gunma (JP); Tsuneaki Ishima, Gunma (JP); Tomio Obokata, Tochigi (JP); Yasuhiro Fujiwara, Saitama (JP); Hisao Nakamura, Gunma (JP)

(73) Assignee: National University Corporation Gunma University, Gunma (JP)

( * ) Notice: Subject to any disclaimer, the term of this patent is extended or adjusted under 35 U.S.C. 154(b) by 360 days.

(21) Appl. No.: 11/909,792

(22) PCT Filed: Mar. 22, 2006

(86) PCT No.: PCT/JP2006/306370

§ 371 (c)(1),
(2), (4) Date: Aug. 21, 2008

(87) PCT Pub. No.: WO2006/104176

PCT Pub. Date: Oct. 5, 2006

(65) Prior Publication Data

US 2009/0007695 A1    Jan. 8, 2009

(30) Foreign Application Priority Data

Mar. 29, 2005  (JP) .............................. 2005-095570

(51) Int. Cl.
*G01M 15/02* (2006.01)
(52) U.S. Cl. ................................. 73/114.48; 73/114.51
(58) Field of Classification Search ............... 73/114.38, 73/114.42, 114.43, 114.45, 114.48, 114.51
See application file for complete search history.

(56) References Cited

U.S. PATENT DOCUMENTS 4,788,858 A * 12/1988 Liebermann ............. 73/114.48

(Continued)

FOREIGN PATENT DOCUMENTS

JP      61-004860      1/1986

(Continued)

OTHER PUBLICATIONS

European Search Report for corresponding European application 06730318.0-1234 lists the references above.

*Primary Examiner*—Eric S McCall
(74) *Attorney, Agent, or Firm*—Hogan Lovells US LLP

(57) ABSTRACT

A gaseous fuel injector 3 supplies gaseous fuel from a compressed gas cylinder 1 into a measuring portion thin tube 5 and pressure change in the tube is measured by a pressure measuring device 4 through a small hole provided in the thin tube 5. An extension thin tube 6 for removing the influence of reflected waves is provided on the downstream side of the measuring portion thin tube 5. There is provided at the downstream side end of the extension thin tube a back pressure valve 13 for uniformly increasing the pressure in the tube and for bringing the pressure close to the actual environment in the engine cylinder. Also, a tapered-shape nozzle is arranged in the measuring portion thin tube 5. Pressure measured by the pressure measuring device 4 is transduced into mass flow rate in the thin tube according to a predetermined calculation formula. Accordingly, it is possible to measure instantaneous mass flow rate of gaseous fuel injected from the gaseous fuel injector.

6 Claims, 6 Drawing Sheets

U.S. PATENT DOCUMENTS

| | | | |
|---|---|---|---|
| 4,791,810 A | 12/1988 | Old et al. | |
| 4,845,979 A * | 7/1989 | Farenden et al. | 73/114.45 |
| 7,096,724 B2 * | 8/2006 | Wildman | 73/114.48 |
| 7,197,918 B2 * | 4/2007 | Shen | 73/114.51 |
| 2005/0034514 A1 * | 2/2005 | Shen | 73/119 A |
| 2005/0217359 A1 * | 10/2005 | Wildman | 73/119 A |
| 2007/0240500 A1 * | 10/2007 | Pollard et al. | 73/119 A |

FOREIGN PATENT DOCUMENTS

| | | |
|---|---|---|
| JP | 2003-028689 | 1/2003 |
| JP | 2004-170187 | 6/2004 |
| WO | 9967617 A1 | 12/1999 |

* cited by examiner

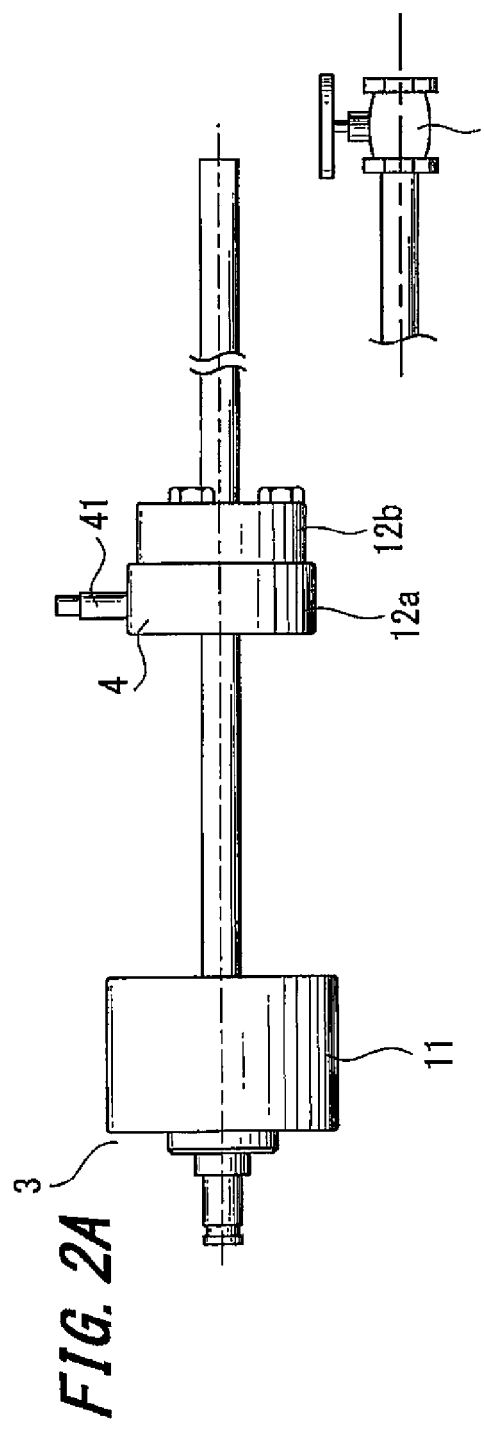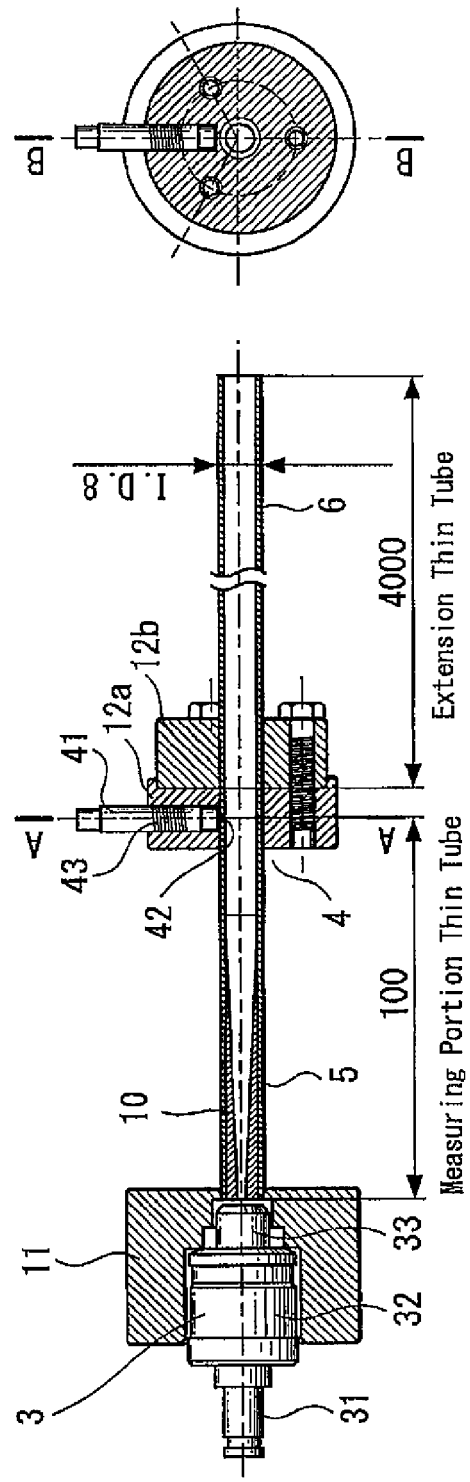

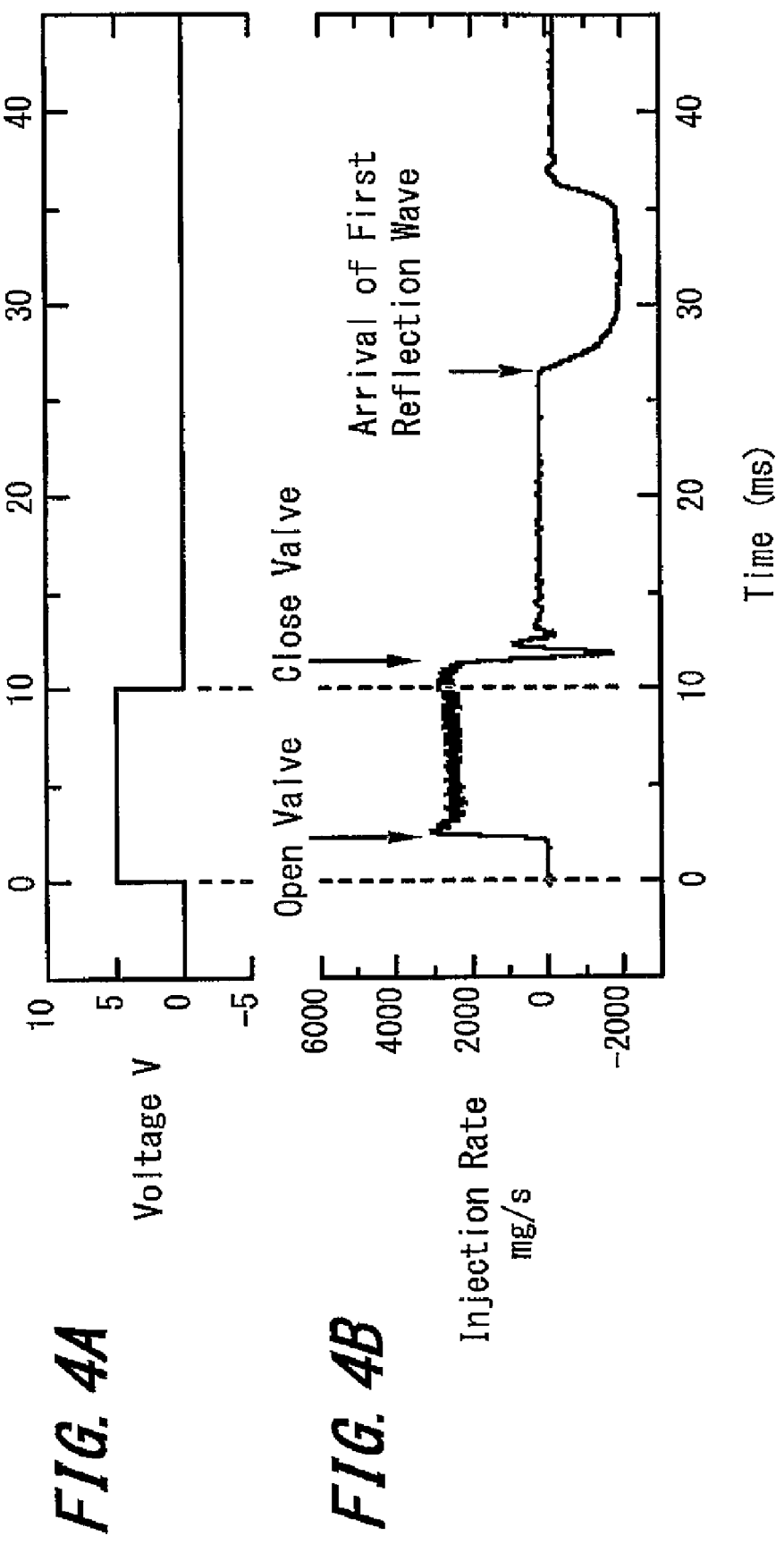

INSTANTANEOUS FLOW RATE MEASUREMENT INSTRUMENT OF GASEOUS FUEL INJECTOR

CROSS-REFERENCE TO THE RELATED APPLICATIONS

This application is a national stage of the international application No. PCT/JP2006/306370 filed Mar. 22, 2006, which is also claims benefit of priority under 35 U.S.C. §119 to Japanese Patent Application No. 2005-095570 filed Mar. 29, 2005, the entire contents of which are incorporated by reference.

TECHNICAL FIELD

The present invention relates to an instrument for measuring instantaneous flow rate of gaseous fuel injected from a fuel injection system, particularly, a gaseous fuel injector or to an instrument for measuring instantaneous flow rate in various kinds of gas pipes or the like where the flow rate fluctuates rapidly.

BACKGROUND ART

In recent years, gaseous fuels such as hydrogen and compressed natural gas (CNG: Compressed Natural Gas) other than liquid fuels of gasoline, diesel fuel and the like have been widely used as fuels for automobiles. In particular, CNG draws attention as a clean energy source based on advantages such as (i) calorific value per unit $CO_2$ emission is large and (ii) there is no emission of sulfur oxide, because sulfur component is hardly included. In the case of applying CNG to an automobile engine, similarly to gasoline and diesel fuel in the past, it is injected from a fuel injector into an intake port or cylinder of the engine.

Also, with respect to liquid fuels of gasoline, diesel fuel and the like, evaporation is promoted by being injected from a fuel injector at a high pressure and by supplying the liquid fuel as fine droplets. Here, in many cases of the gasoline engine, the injector is located at a portion of an intake manifold in the vicinity of the intake valve and the fuel injection pressure becomes around 3 atm.

Recently, a system in which gasoline is injected directly into the cylinder, that is, an engine of a system referred to as GDI (Gasoline Direct Injection) has been taken into consideration. In this system, a stratified mixture of gasoline and air is formed in the cylinder and according to this system, it is possible to move an automobile with less fuel, but the pressure in the cylinder is high, so that it is necessary to supply atomized gasoline into the cylinder with more pressure than that, for example, with injection pressure of around 100 atm. The fuel injection duration at one stroke in this case is around several msec to several dozen msec and at that time, the duration required for the opening and closing of an electromagnetic valve that is opened and closed by a solenoid becomes an extremely short duration of around several hundred nsec to several msec.

Fuel flow rate per unit time ($m^3$/sec) in the case of supplying liquid fuel into the cylinder by opening and closing the electromagnetic valve is referred to as the injection rate, and accurate measurement of the injection rate is required. Generally, when an injection valve is in an opening state, the injection rate increases as the opening duration increases and is converged with a constant value (saturated state). Then, when the injection valve is in a closing state, there is a tendency of decreasing the injection rate along with the elapse of time and it returns to the original state. As an instrument (instantaneous flow rate meter) for measuring the injection rate (synonymous with "instantaneous flow rate") from an liquid fuel injector, a system referred to as Bosch type (Bosch type injection rate measuring device) is widely used (for example, see Non-patent Document 1).

The Bosch type injection rate measuring device employs a method in which the fuel from the liquid fuel injector is injected into a pipe having a constant cross-sectional area and the fuel flow rate is obtained from the increase in pressure in the pipe. This uses such a fundamental principle that in the case of injecting the fuel into a thin tube from the fuel injector the injection rate ($m^3$/sec) is obtained by multiplying the thin tube cross-sectional area ($m^2$) and flow velocity (m/sec). More specifically, it is a system in which when the fuel injected from the injector flows in a thin tube, then, the pressure increase occurs as a result thereof, and the instantaneous flow rate of the fuel is obtained by measuring the pressure increase.

However, although it is possible to use the Bosch type injection rate measuring device for the measurement of the liquid fuel, it was not possible to use it for a gaseous fuel such as hydrogen and compressed natural gas (CNG). More specifically, in the case of applying the Bosch type device to a gaseous fuel injector, there is a problem that the measurement of flow becomes impossible because of compressibility of the gas, that is, property in which density varies together with pressure change, and increase in pipe friction or the like caused by the increase of Reynolds number. Up to now, an instantaneous injection rate of a gaseous fuel has hardly been measured.

Here, the Reynolds number Re is referred to as a dimensionless value obtained by dividing a value $\rho*U*D$(kg/(m·sec)), which is obtained by multiplying the fluid density $\rho$ (kg/$m^3$) and the fluid velocity U (m/sec) and the diameter D(m) of the thin tube, by the viscosity coefficient $\mu$ (Pa·sec=kg/(m·sec)). The $\rho*U*D$ of the fluid relates to inertial force showing the force of flow and the viscosity coefficient $\mu$ relates to viscous force showing viscous behavior. When the Reynolds number Re is small, the viscous behavior prevails, so that laminar flow without turbulence occurs and the measurement of the injection rate is possible, but when the Reynolds number is large, the gas flow becomes turbulent (turbulent flow occurs) and the measurement of the injection rate becomes impossible due to the fact that it is difficult for the gas to flow by the pipe friction. Actually, it is known that a turbulent flow state may occur when the Reynolds number Re is approximately 2500 or more and a laminar flow occurs when it is approximately 2500 or less.

Generally, in a gaseous fuel injection, the Reynolds number Re becomes as much as several hundred thousands and the flow in the tube is turbulent, so that pressure difference between the upstream side and the downstream side of the tube (this is referred to as "pressure drop") becomes large and the measurement of the injection rate becomes impossible.

Generally, the characteristic of the fuel injector is significant, because it is linked directly with the engine performance. Further, the fuel injector characteristic of measuring the injection rate which changes with time (instantaneous flow rate: fuel flow per unit time) is requested as the most important factor. However, with respect to a gaseous fuel injector, means for measuring the injection rate thereof has not been established as mentioned above. For this reason, steady flow rate data are obtained while keeping the injector with a valve opened and carrying out a steady-state injection and the injection rate on an occasion of an actual injection is estimated.

Also, a method can be taken into consideration in which a gaseous fuel injector is attached to a vacuum vessel and the pressure increase in the vessel is measured by carrying out injections, for example, 1000 times ("injection duration" of one stroke is fixed at, for example, 2 msec) into the vessel from the injector. Specifically, an average injection rate per stroke can be obtained by calculating pressure increase per stroke from the pressure increase caused by the injections 1000 times. However, it is not possible by this method to measure the instantaneous injection rate of the gaseous fuel. Until now, there has been no report that an instantaneous injection rate from a gaseous fuel injector has been measured.

[Non-patent Document 1] Hiroshi Hayashi "Bosch type injection rate meter" (Internal-combustion Engines Vol, 7, No. 12, pages 58 to 64)

DISCLOSURE OF THE INVENTION

The present invention is made in view of the problems as mentioned above and directed to provide an injection rate measurement device for measuring instantaneous flow rate from a gaseous fuel injector, measuring the instantaneous injection rate of the gaseous fuel by designing such that the pressures at the upstream side and the downstream side of a tube become constant as much as possible.

In order to solve the abovementioned problems and to accomplish the object of the present invention, an instantaneous flow rate measurement instrument of a gaseous fuel injector according to the present invention is characterized by including: a gaseous fuel injector having an electromagnetic valve inside and injected with a gaseous fuel; an injector drive means for controlling opening and closing of the electromagnetic valve; a measuring portion thin tube connected to the gaseous fuel injector and supplied with the gaseous fuel from the gaseous fuel injector; a nozzle provided in the measuring portion thin tube and having a cross section that changes from small area to large area in the direction from the gaseous fuel injector to the downstream side of measuring portion thin tube; an extension thin tube provided at a downstream side end of the measuring portion thin tube; a pressure measuring means arranged close to a small hole provided in the measuring portion thin tube; and a means for transducing the pressure in the measuring portion thin tube which has been measured by the pressure measuring means into a flow rate of the gaseous fuel flowing in the measuring portion thin tube based on a predetermined conversion formula.

Also, the instantaneous flow rate measurement instrument of the gaseous fuel injector according to a preferable embodiment of the present invention is characterized in that the aforesaid nozzle has a tapered shape or the shape is changed stepwise in the direction from the gaseous fuel injector side to the downstream side of the thin tube for measurement.

Further, the instantaneous flow rate measurement instrument of the gaseous fuel injector according to a preferable embodiment of the present invention is characterized in that the pressure measuring means includes a piezoelectric element for detecting pressure in the thin tube from a small hole provided in the measuring portion thin tube and the pressure in the measuring portion thin tube is measured by transducing the pressure to an electric signal.

Further, the instantaneous flow rate measurement instrument of the gaseous fuel injector according to the present invention uses a conversion formula transducing the pressure in the measuring portion thin tube into the flow rate of the gaseous fuel flowing in the measuring portion thin tube, represented by:

$$\dot{M}(t) = A \cdot \rho(t) \cdot u(t)$$

$$= \frac{2A}{\kappa - 1} \left( \sqrt{\frac{\kappa \cdot \rho_1}{P_1^{1/\kappa}}} P(t)^{(\kappa+1)/2\kappa} - \sqrt{\frac{\kappa \cdot \rho_1}{P_1^{(2-\kappa)/\kappa}}} P(t)^{1/\kappa} \right)$$

where, A is cross-sectional area ($m^2$) of the measuring portion thin tube, $\rho(t)$ is density ($kg/m^3$) of the gaseous fuel, $u(t)$ is flow velocity (m/sec) of the gaseous fuel, K is specific heat ratio (dimensionless thermal insulation coefficient), $P(t)$ is pressure (Pa) in the measuring portion thin tube, $P_1 = P(0)$ and $\rho_2 = \rho(0)$.

According to the present invention, it becomes possible to provide an instrument for measuring an instantaneous flow rate of gaseous fuel, that is, an injection rate measurement device for a gaseous fuel injector which has not been obtained. Accordingly, it becomes possible to readily carry out engine design or the like which uses gaseous fuel of hydrogen, CNG or the like. Also, the utilization thereof is possible not only for the field of automobile engine but also for instruments for measuring instantaneous flow rate in various kinds of gas pipes or the like where the flow rate fluctuates rapidly.

BRIEF DESCRIPTION OF DRAWINGS

FIGS. 2A to 2C are diagrams showing main portions of a flow rate measurement instrument of a gaseous fuel injector according to an embodiment of the present invention.

FIGS. 4A and 4B are diagrams showing the change of a drive signal for opening and closing an electromagnetic valve and the change of injection rate with time regarding a gaseous fuel injector according to the present invention.

BEST MODE FOR CARRYING OUT THE INVENTION

Figure 1:
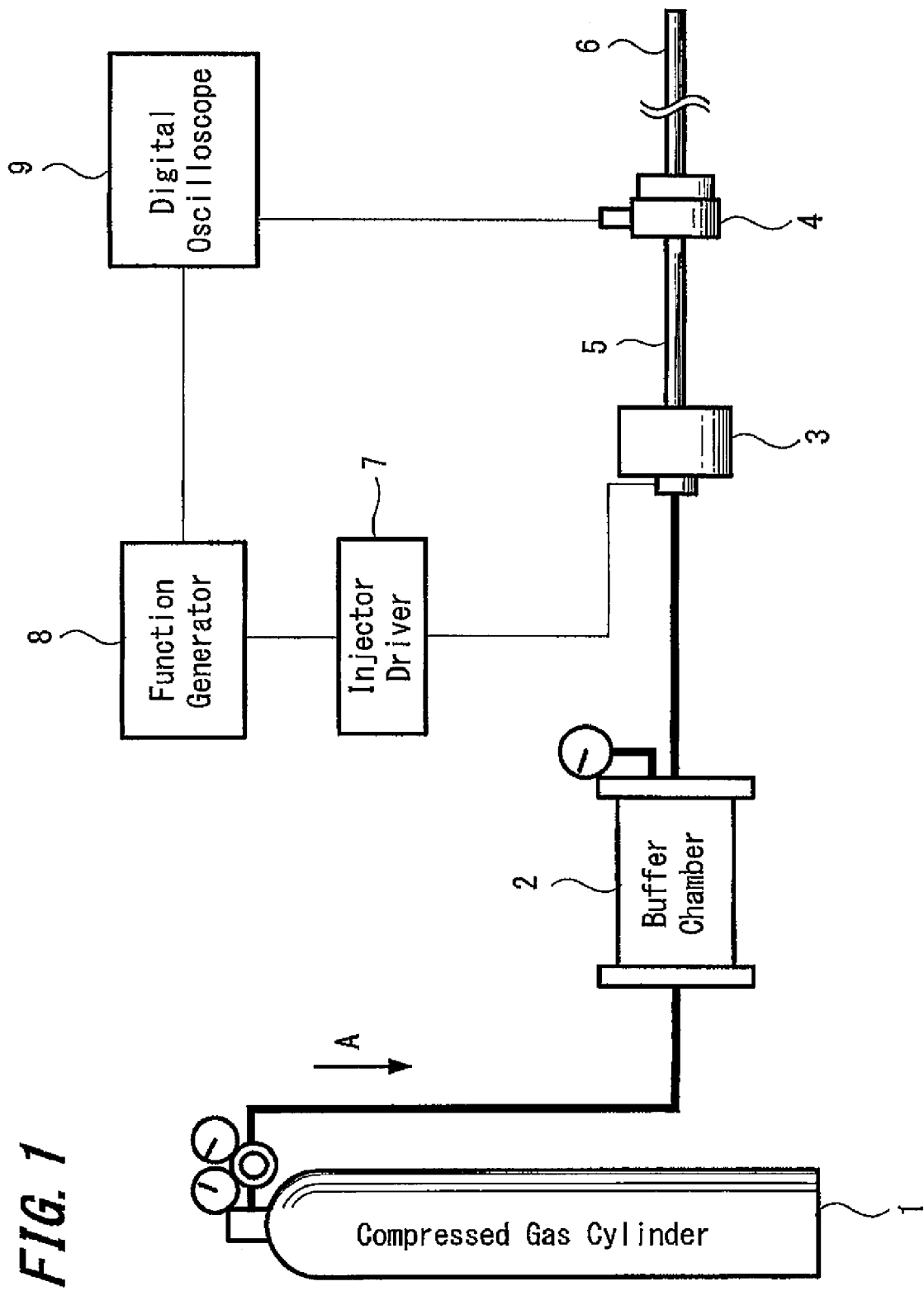
FIG. 1 is a diagram showing a flow rate measurement instrument of a gaseous fuel injector according to an embodiment of the present invention.

Hereinafter, an instantaneous flow rate measurement instrument for a gaseous fuel according to an embodiment of the present invention will be described with reference to the drawings; but before that, mathematical formulas representing the basic principle for measuring the flow rate of injected gas of a gaseous fuel according to the present invention will be described.

The basic configuration according to the present invention is similar to the Bosch type fuel injection rate measurement device for the liquid fuel mentioned above. More specifically, the system of the present invention also has a similarity with the Bosch type fuel injection rate measurement device in which the injection rate is obtained on an assumption of one-dimensional flow.

However, as mentioned above, in the case of injecting gaseous fuel directly to the Bosch type injection rate measurement device, the Reynolds number of the flow in a pipe reaches several hundred thousands, so that a large pipe friction occurs and the measurement of the flow rate becomes impossible. Actually, in the case of gaseous fuel, a large pressure difference occurs between the upstream side and the downstream side of a tube and in the case of measuring the pressure by placing a pressure sensor on the upstream side of the tube, a pressure larger than the pressure at the center portion or the downstream side portion of the tube may be measured. For this reason, in a case in which such a large pressure difference exists between the upstream side and the downstream side of the tube, the measurement of the flow rate may become impossible. In the case of gaseous fuel, cubic volume per injection at a time is much larger than that of liquid fuel and then, the injection velocity thereof is great as compared with that of liquid fuel.

In the present invention, in order to suppress the Reynolds number to be low, it is attempted that the internal diameter of the pipe is enlarged from the diameter of 4 mm$\phi$ in the past to the diameter of 8 mm$\phi$ and the flow velocity in the pipe is suppressed to be low.

Along with the enlargement of the internal diameter of the pipe, the difference between the exit diameter of the fuel injector and the internal diameter of the pipe becomes large, so that there appears a phenomenon in which gaseous fuel immediately after the injection fluctuates. In the present invention, in order to avoid this, there is provided a divergent nozzle at the exit of the fuel injector to stabilize the flow.

Also, in the present invention, a basic principle of calculating instantaneous flow rate of the gaseous fuel from the pressure variation in the measuring portion thin tube is used. In the Bosch type injection rate measurement device for the liquid fuel, also the instantaneous flow rate of the liquid fuel is calculated from the pressure variation in the measuring portion thin tube. However, in the Bosch type injection rate measurement device, liquid fuel is used, so that compressibility of the flow is not considered. For this reason, if the conversion formula used in the Bosch type injection rate measurement device (for example, see Non-patent Document 1) is used without any change, it is impossible to obtain the injection rate of the gaseous fuel.

Hereinafter, a method for deriving the instantaneous flow rate of the gaseous fuel according to the present invention will be described using mathematical formulas.

In order to explain a method for deriving the instantaneous flow rate according to the present invention, the flow is assumed to be one-dimensional, compressible, inviscid, and adiabatic in the theory mentioned below.

A case in which a gas flows in a tube having a constant cross-sectional area $A(m^2)$ at the speed of du(m/sec) will be represented. Gas in front of the flowing gas is compressed by the flow and causes a pressure wave. The pressure wave becomes a sound wave and propagates at the sound speed a (m/sec). Now, a cubic volume surrounded by the wave front of the pressure wave (wave front in the range the sound can reach) and a cylindrical pipe having a cross-sectional area A is examined and changes of temperature, pressure, density and gas velocity are observed on the upstream side and on the downstream side of the tube.

First, the mass conservation law is obtained before and after the wave front of the pressure wave, enabling

[formula 1]

$$\rho a A = (\rho + d\rho)(a - du) A \quad (1)$$

to be obtained. Here, $\rho$ is density (kg/m$^3$) and d$\rho$ is component of density increased. d$\rho$*du which is a quadratic minute term is far smaller compared with $\rho$a, so that when this is omitted, formula (2) is obtained.

[formula 2]

$$\frac{d\rho}{\rho} = \frac{du}{a} \quad (2)$$

Also, based on the fact that the momentum change before and after the wave front of the pressure wave and the impulse are equal, formula (3) is obtained. More specifically, supposing that the pressure near the injector seen from the wave front of the pressure wave is (P+dP)(Pa) and the pressure on the side opposite to the injector seen from the wave front is P, the left-hand side of the formula (3) becomes the impulse (N-sec) pressing the wave front per unit time. On the other hand, the right-hand side of the formula (3) is a product of the mass per unit time $\rho a A((kg/m^3)*(m/sec)*(m^2)*sec=kg)$ and the velocity change before and after the wave front (momentum change).

[formula 3]

$$A[(P+dP)-P] = \rho a A[a-(a-du)] \quad (3)$$

is obtained. As a result, formula (4) is obtained.

[formula 4]

$$dP = \rho a du \quad (4)$$

In this formula (4), when the sound speed a and the density $\rho$ are functions of time, the gas velocity change du for each instant of time can be represented as follows:

[formula 5]

$$du = \frac{1}{a(t) \cdot \rho(t)} dP \quad (5)$$

and it can be understood that du can be described by the pressure change dP, the sound speed a and the density $\rho$.

Accordingly, when the sound speed and the density are obtained, the flow velocity can be obtained by the pressure measurement alone. Here, adiabatic change is assumed, so that formula (6) is obtained between the density $\rho$ and the pressure P.

[formula 6]

$$\frac{P}{\rho^\kappa} = const. \quad (6)$$

Accordingly, based on the formula (6), the density $\rho$ can be described only by the pressure. Also, the sound speed can be generally described as formula (7):

[formula 7]

$$a(t) = \sqrt{\frac{\kappa \cdot P(t)}{\rho(t)}} \quad (7)$$

Here, when the density ρ is calculated from the formula (6), it becomes as seen in formula (8).

[formula 8]

$$\rho(t) = \rho_1 \left(\frac{P(t)}{P_1}\right)^{1/\kappa} \tag{8}$$

In this formula (8), $\rho_1$ and $P_1$ are initial values of density and pressure respectively, and $\rho(0)=\rho_1$, $P(0)=P_1$ are obtained. Also this $\rho(t)$ can be obtained only by the pressure.

Here, when substituting aforesaid formulas (7) and (8) in the formula (5) and by carrying out the rearrangement thereof, formula (9) is obtained.

[formula 9]

$$du = \sqrt{\frac{P_1^{1/\kappa}}{\kappa \cdot \rho_1}} P(t)^{-(\kappa-1)/2\kappa} dP \tag{9}$$

When integrating this formula (9), the gas velocity u(t) can be expressed by formula (10).

[formula 10]

$$u(t) = 2\sqrt{\frac{\kappa \cdot P_1^{1/\kappa}}{\rho_1(\kappa-1)^2}} P(t)^{(\kappa-1)/2\kappa} + C \tag{10}$$

In this formula (10), when introducing $P(0)=P_1$, $u(0)=0$ in the initial condition t=0, formula (11) is obtained.

[formula 11]

$$C = -2\sqrt{\frac{\kappa \cdot P_1}{\rho_1(\kappa-1)^2}} \tag{11}$$

The mass flow rate M(t) of gas at each instant obtained from the formulas (8), (10) and (11) mentioned above becomes the one as seen in formula (12). Here, M with a dot in the formula (12) means a mass flow rate per unit time (injection rate).

[formula 12]

$$\dot{M}(t) = A \cdot \rho(t) \cdot u(t) \tag{12}$$
$$= \frac{2A}{\kappa-1}\left(\sqrt{\frac{\kappa \cdot \rho_1}{P_1^{1/\kappa}}} P(t)^{(\kappa+1)/2\kappa} - \sqrt{\frac{\kappa \cdot \rho_1}{P_1^{(2-\kappa)/\kappa}}} P(t)^{1/\kappa}\right)$$

As being clear from the formula (12), it can be understood that the mass flow rate M(t) of gas becomes a function of the pressure P(t) alone. Accordingly, the mass flow rate of gas can be calculated at each instant by measuring the change of the pressure with time in the measuring portion thin tube and by substituting the value thereof in the formula (12).

Hereinafter, an instrument for measuring an instantaneous pressure which is necessary when the mass flow rate of gas is measured according to an embodiment of the present invention will be explained based on the drawings using the calculation formula (12).

FIG. 1 is a diagram showing an outline of an instrument for measuring instantaneous flow rate of a gaseous fuel. The instrument for measuring instantaneous flow rate of a gaseous fuel according to an embodiment of the present invention includes: a compressed gas cylinder 1, a buffer chamber 2 connected to the compressed gas cylinder 1, a gaseous fuel injector 3 to which fuel gas is supplied through the buffer chamber 2, a pressure measuring device 4, a measuring portion thin tube 5 to which gas flows, and an extension thin tube 6. Also, the instrument for measuring instantaneous flow rate of a gaseous fuel according to the embodiment includes, other than the aforesaid configuration, an injector driver 7 for opening/closing and controlling an opening and closing valve (not shown) of the gaseous fuel injector 3 for supplying the gaseous fuel to the measuring portion thin tube 5 using a solenoid, a function generator 8 for supplying a rectangular wave pulse to the injector driver 7, a digital oscilloscope 9 for observing waveforms generated from the function generator 8 and for observing the pressure in the thin tube which is measured using the pressure measuring device 4. The oscilloscope 9 is not necessarily a digital oscilloscope but may be an analog oscilloscope.

FIGS. 2A to 2C are diagrams showing in detail the portions of the gaseous fuel injector 3 and the pressure measuring device 4 used in the embodiment of the present invention. FIG. 2A is a schematic diagram showing the whole configuration of the gaseous fuel injector 3 and the pressure measuring portion 4, FIG. 2B is a cross-sectional side view of FIG. 2A (cross-sectional view on line B-B in FIG. 2C), and FIG. 2C is a cross-sectional view of a portion on line A-A shown in FIG. 2B.

The gaseous fuel injector 3 includes a fuel injection portion 31, an electromagnetic valve opening and closing portion 32, and a fuel injection portion 33. Further, the measuring portion thin tube 5 includes a tapered shape nozzle 10 in the inside thereof. Also, the measuring portion thin tube 5 is provided with a small hole (static hole) 42 and a pressure transducer 41 of the pressure measuring portion 4 is arranged close to the small hole 42. A piezoelectric element 43 is provided in the inside of the pressure transducer 41. The gaseous fuel injector 3 is fixed by a flange 11 and also the pressure transducer 41 is fixed by a flange 12a on a base unit which is not shown.

Next, an operation according to an embodiment of the present invention will be explained based on FIG. 1 and FIG. 2.

In FIG. 1, gaseous fuel from the compressed gas cylinder 1 is introduced to the buffer chamber 2 along an arrow A shown in the drawing. The buffer chamber 2 is provided to remove fluctuation of the gaseous fuel supplied from the compressed gas cylinder 1, and the pressure of the gaseous fuel supplied from the buffer chamber 2 is made to be approximately constant and the fuel is supplied to the gaseous fuel injector 3.

An electromagnetic valve which is not shown is provided in the inside of the electromagnetic valve opening and closing portion 32 of the gaseous fuel injector 3 and the electromagnetic valve is opened and closed upon receiving the control signal from the injector driver 7. Here, the duration of opening the electromagnetic valve at a time of injection may be several msec to several dozen msec. Then, the gaseous fuel supplied from the buffer chamber 2 to the gaseous fuel injector 3 is injected from the fuel injection portion 33 into the measuring portion thin tube 5. The internal diameter of the measuring portion thin tube 5 is 8 mmφ (cross-sectional area is constant) and the length thereof is around 100 mm. In the inside of measuring portion thin tube 5, there is provided the nozzle 10 extending in a tapered shape from the diameter 2 mmφ of the injector tip of the fuel injection portion 33 to the internal diameter 8 mmφ of the thin tube. The reason for providing the nozzle 10 is that the injected gas may start fluctuating and become a turbulent flow if the gaseous fuel is injected from the injector tip of the diameter 2 mmφ to the thin tube of the diameter 8 mmφ without providing the nozzle 10. It is necessary to suppress the turbulence in the tube in order to measure the pressure in the measuring portion thin tube 5 accurately and for this reason, the nozzle 10 is provided. However, the nozzle 10 is not necessarily tapered and it may have a step-like shape in which the opening becomes larger stepwise.

Also, the measuring portion thin tube 5 is provided with the small hole (static hole) 42 having the diameter of around 1 mmφ and the pressure in the measuring portion thin tube 5 is measured by the pressure transducer 41 arranged close to the small hole 42. More specifically, by injecting the gaseous fuel into the measuring portion thin tube 5, pressure waves occur in the measuring portion thin tube 5 and the pressure in the measuring portion thin tube 5 varies. In addition, other than the above, it is also possible to employ a method of capturing a minute deformation of the measuring portion thin tube 5 caused by pressure variation using a strain gauge for measuring the pressure, a method of measuring the pressure by a pressure transducer placed on the same surface as the inner wall surface of the measuring portion thin tube 5 or the like. However, in the case of using the small hole 42, it becomes possible to measure the pressure in an extremely small range and it becomes possible to carry out measurement of high resolution in terms of space and time.

Further, in the embodiment of the present invention, the extension thin tube 6 is mounted on the downstream side of the measuring portion thin tube 5. The diameter of the extension thin tube 6 is 8 mmφ the same as that of the measuring portion thin tube 5 and the length thereof is long such as 4 m. The length of the extension thin tube 6 is made long so as to eliminate influence of reflected waves in the pressure measuring portion of the measuring portion thin tube 5. In other words, the pressure wave caused by the fuel injection is reflected by the downstream side end of the thin tube and returns as a reflected wave to the pressure measuring portion of the measuring portion thin tube 5. Since the measurement becomes impossible if such reflected waves are superimposed on the normal pressure waves caused by the fuel injection, the extension thin tube 6 is provided to gain time until the arrival of the reflected wave. The device may be small-sized if the extension thin tube 6 is wound to have a coil shape. Generally, the downstream side end of the extension thin tube 6 is open to the air, but the back pressure valve 13 may be provided at the downstream side end of the extension thin tube 6 so as to reduce the flow. When the gaseous fuel is injected repeatedly in a state in which the degree of opening of the back pressure valve 13 is reduced, the pressure in the measuring portion thin tube 5 and extension thin tube 6 increases uniformly. In this case, the pressure increases uniformly in the measuring portion thin tube 5 and extension thin tube 6 differently from the pressure increase caused by the tube friction in the thin tube, accordingly, it may not cause a problem for the measurement. In addition, by injecting the gaseous fuel into the thin tube in which the pressure is increased, measurement which simulates an actual condition of fuel injection into an engine cylinder (in a state of high pressure) can be carried out.

In the experiment mentioned below, it is assumed that the pressure variation in the measuring portion thin tube 5 is caused by one-dimensional, compressible, inviscid and adiabatic flow. Then, a relationship between the gas flow and the pressure change is studied in advance to measure the change in the actual pressure in the tube with time, thereby measuring the flow of the gaseous fuel which changes momentarily.

(Example of Experiment)

Figures 3A, 3B:
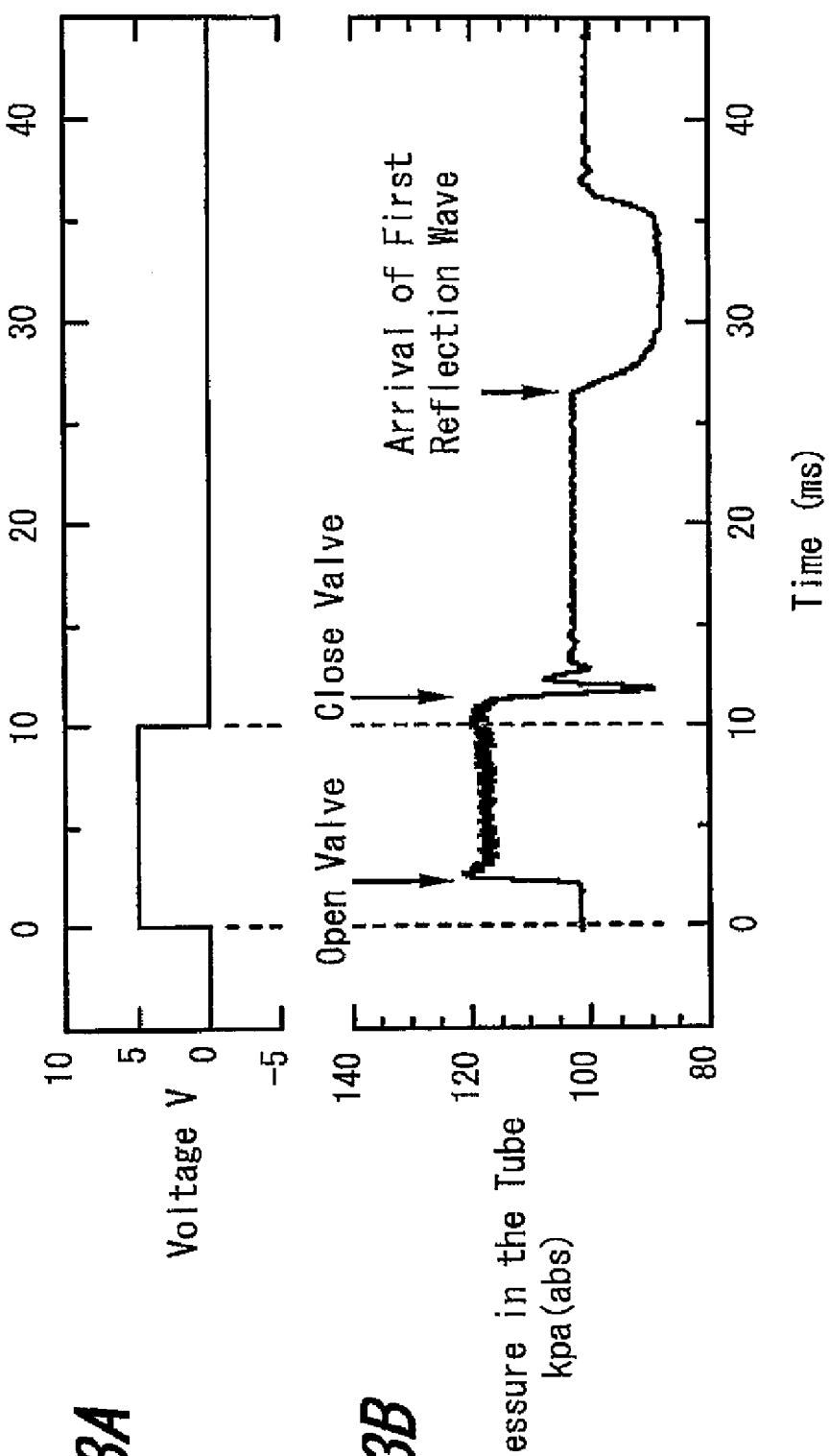
FIGS. 3A and 3B are diagrams showing the change of a drive signal for opening and closing an electromagnetic valve and the change of pressure in a measuring portion thin tube with time regarding a gaseous fuel injector according to the present invention.

FIGS. 3A and 3B are diagrams showing experimental result obtained by measuring the pressure in the measuring portion thin tube 5 using the device shown in FIGS. 1 and 2. FIG. 3A shows a rectangular signal applied from the function generator 8 to the injector driver 7. Also, FIG. 3B is a waveform diagram showing the pressure change of the pressure measuring portion using the digital oscilloscope 9 when the rectangular signal is supplied to the gaseous fuel injector.

Here, in the experiment, an injector (KEIHIN 06164 PDN J00) and an injector driver (KEIHIN 37815 PDN J01) manufactured by Keihin Corporation (Hereinafter, referred to as "Keihin Corp.") were purchased and used as an injector for a natural gas fueled automobile. It should be noted that nitrogen was used for the simulated fuel instead of the actual CNG from a safety point of view. Also, the injection pressure of the simulated fuel was made to be 0.255 MPa. It should be noted that in the present invention it is possible to carry out the measurement of the instantaneous flow of every gas (for example, hydrogen fuel or the like), even if the kind of gas changes, by substituting the gas properties thereof (density $\rho$, specific heat ratio $K$ and the like) in the formula (12).

FIGS. 3A and 3B are drawings showing the change (history) of a drive signal applied to the injector driver 7 (FIG. 3A) and the change (history) of the pressure at the measuring portion (position of pressure measuring device 4) in the measuring portion thin tube 5 (FIG. 3B) when the injection duration is 10 msec. In FIG. 3B, the horizontal axis shows time (msec) and the vertical axis shows pressure (kPa) in the measuring portion thin tube 5.

As shown in FIG. 3B, the pressure in the measuring portion thin tube 5 increases after a predetermined time has passed (around 2 msec) from the time (0 sec) of the valve opening signal input to the injector driver 7 and the pressure in the thin tube 5 decreases similarly after a predetermined time has passed (around 2 ms) from the control signal (10 msec later) which closes the electromagnetic valve input to the same injector 3. Since the electromagnetic valve of the gaseous fuel injector 3 is opened after a predetermined time delay from the valve opening signal inputted at time 0, this time difference (time lag) occurs.

The simulated fuel (nitrogen gas) flows into the measuring portion thin tube 5 by the valve opening signal and the pressure thereof increases with time. Then, the flow becomes steady when the gaseous fuel injector 3 is fully operated and the pressure becomes constant. Then, the pressure decreases after closing the valve of the gaseous fuel injector 3 and returns to the initial value, and one injection cycle terminates. Pressure decrease is shown at the time of approximately 25 to 27 ms, which is caused by pressure waves reflected by the downstream side end of the extension thin tube 6 and returning to the measuring position. The duration before the return of reflected waves is a duration where measurement can be carried out. The time at which the reflected wave returns can be adjusted by changing the length of the extension thin tube 6. In the example of FIG. 3, the valve opening duration of the gaseous fuel injector 3 is 10 msec, but a similar result is shown when the valve opening duration is changed in the range of 3.4 to 20 msec.

FIGS. 4A and 4B are, similar to FIGS. 3A and 3B, diagrams showing the change of the gaseous fuel injection rate (unit is mg/sec: amount of fuel injection per unit time) when supplying a drive signal of a rectangular wave for 10 msec from the function generator 8 to the injector driver 7. FIG. 4A shows a drive signal supplied to the injector driver 7 and FIG. 4B shows the gaseous fuel injection rate. The horizontal axis shows time.

The injection rate can be obtained by substituting the change of the pressure with time measured in the measuring portion thin tube 5 in the formula (12).

As described above, since the measurement of the change in the injection rate of the gaseous fuel with time can be carried out, there may be obtained in detail the characteristics of the gaseous fuel injector 3 such as a transient characteristic on the occasion of opening and closing the valve of the gaseous fuel injector, flow fluctuation due to the propagation of the pressure wave in a fuel thin tube and the like.

Figure 5:
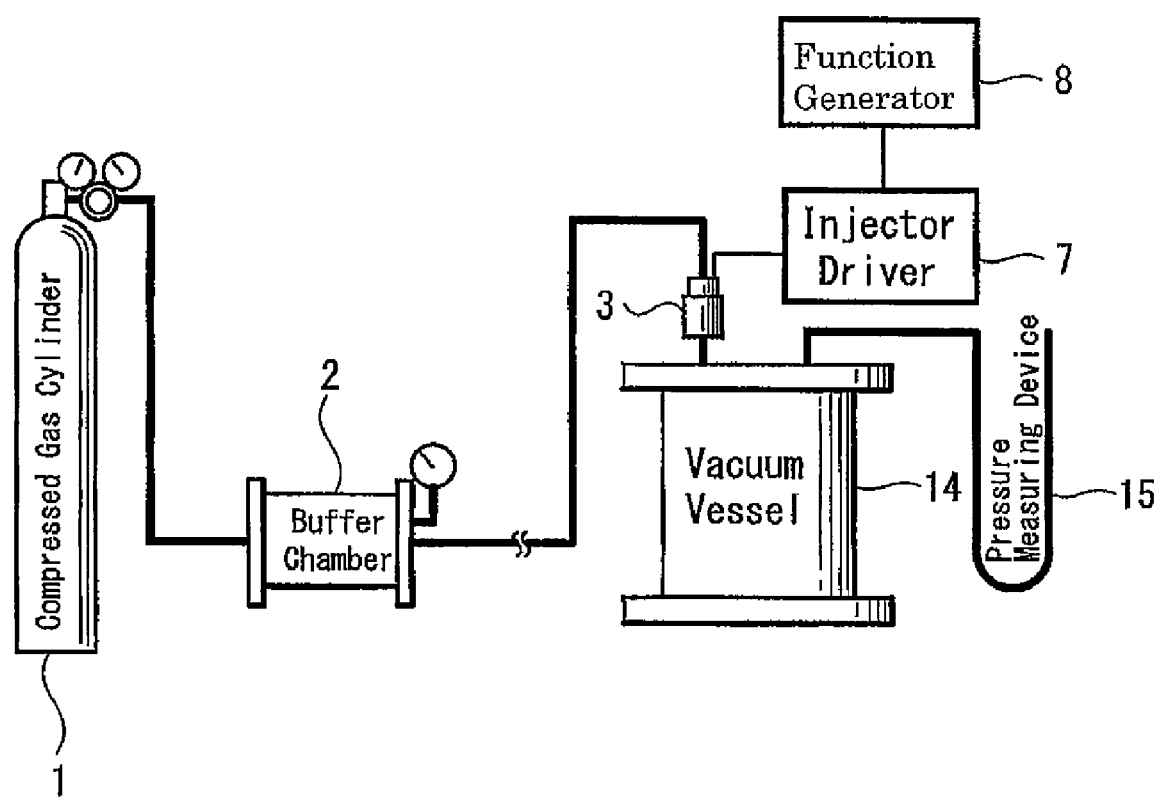
FIG. 5 is a schematic diagram for carrying out a calibration test of a gaseous fuel injector of the present invention.

FIG. 5 is a schematic diagram of a device used for a calibration test. The calibration test for confirming the accuracy of the injection rate measured by the gaseous fuel injection rate measurement device was carried out using this device. In the device used for the calibration test, the same reference numerals are given to devices corresponding to those shown in the experimental instrument of FIG. 1. In the calibration test using the devices shown in FIG. 5, the fuel injector 3 was connected to the vacuum vessel 14 and the fuel was injected into the vacuum vessel 14 differently from the configuration as shown in the experimental instrument in FIG. 1 in which the fuel was injected from the fuel injector 3 and directed to the pressure measuring device 4.

Here, there is a possibility that the pressure fluctuation in tube arrangement on the upstream side of the fuel injector 3 may have influence on the injection rate, so that the tube arrangement from the compressed gas cylinder 1 to the fuel injector 3 which is the same as that of the experimental instrument shown in FIG. 1 is used.

Then, the inside of the vacuum vessel 14 was a vacuum state and a test in which a gaseous fuel was injected from the fuel injector 3 to the vacuum vessel 14 by actuating the function generator 8 and the injector driver 7 was carried out. Then, the injection duration τ was fixed and repeated injections were carried out 1,000 to 2,000 times. The vacuum vessel 14 was installed with a pressure measuring device 15 (mercury manometer) formed with a U-shape glass tube.

According to this experiment, the total mass flow rate of the gas was obtained from the pressure increase in the vacuum vessel 14 and after dividing that by the times of the injection, the mass flow rate per stroke was obtained. On the other hand, the injection rate at each time which was obtained by the injection rate measurement device of the gaseous fuel in the experiment equipment of FIG. 1 was integrated and the mass flow rate per stroke was obtained, and both of them were compared. This comparison result is shown in FIG. 6.

Figure 6:
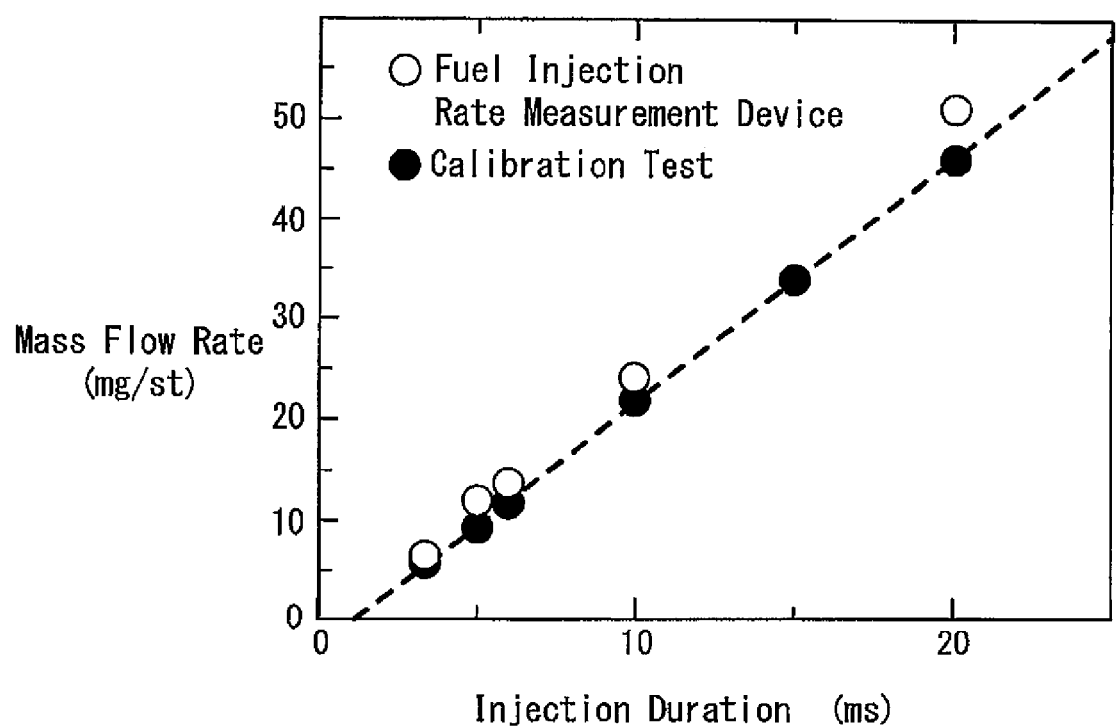
FIG. 6 is a diagram comparing the mass flow rate per stroke (injection at a time) obtained by the experimental arrangement in FIG. 1 according to an embodiment of the present invention and data obtained by a calibration test in FIG. 5.

FIG. 6 is a diagram showing a result of a measurement using the gaseous fuel injection rate measurement device which is used in the embodiment of the present invention and a result of a calibration test, being compared. The vertical axis shows the amount of fuel injection per stroke "per injection" (mass flow rate) and the horizontal axis shows injection duration τ(ms).

It should be noted that cross-check was carried out using a hot-wire flowmeter and a laminar flowmeter with respect to the calibration test in this study, so that the reliability thereof can be comparatively high.

As shown in FIG. 6, it is understood that the result of the measurement using the gaseous fuel injection rate measurement device (mark o) and the result of the calibration test (mark •) vary in response to the injection duration τ, but the difference is approximately 10% at the maximum.

As described above, according to the present invention, measurement of an instantaneous flow rate of a gaseous fuel which was impossible in the past becomes possible. Accordingly, the present invention may have great operational effects on the design or the like of an internal-combustion engine for an automobile using a gaseous fuel, or the design or the like of other fuel injectors and engines.

It should be noted that the embodiment of the present invention shown in FIG. 1 and FIG. 2 has been explained, but it should be appreciated that the present invention includes various modifications other than the embodiment without departing from the scope of the present invention described in the claims.

The invention claimed is:

1. An instantaneous flow rate measurement instrument of a gaseous fuel injector comprising:
    a gaseous fuel injector including an electromagnetic valve inside and injected with a gaseous fuel;
    an injector drive means for controlling opening and closing of the electromagnetic valve;
    a measuring portion thin tube connected to the gaseous fuel injector and supplied with the gaseous fuel from said gaseous fuel injector;
    a nozzle provided in the measuring portion thin tube and having cross section which changes from a small area to a large area from said gaseous fuel injector side to the downstream side of the measuring portion thin tube;
    an extension thin tube provided at a downstream side end of said measuring portion thin tube;
    a pressure measuring means arranged close to a small hole provided in said measuring portion thin tube; and
    a means for transducing the pressure in said measuring portion thin tube which has been measured by said pressure measuring means into flow rate of the gaseous fuel flowing in said measuring portion thin tube based on a predetermined conversion formula.

2. The instantaneous flow rate measurement instrument of a gaseous fuel injector according to claim 1, characterized by further comprising a back pressure valve provided at the downstream side end of said extension thin tube.

3. The instantaneous flow rate measurement instrument of a gaseous fuel injector according to claim 1 or 2, characterized in that the nozzle provided in said measuring portion thin tube has a tapered shape.

4. The instantaneous flow rate measurement instrument of a gaseous fuel injector according to claim 1 or 2, characterized in that the nozzle provided in said measuring portion thin tube includes a plurality of cylindrical members having different diameters which change stepwise toward said downstream side.

5. The instantaneous flow rate measurement instrument of a gaseous fuel injector according to claim 4, characterized in that said pressure measuring means is a pressure transducer having a piezoelectric element for detecting pressure in said measuring portion thin tube from the small hole provided in said measuring portion thin tube.

6. The instantaneous flow rate measurement instrument of a gaseous fuel injector according to claim 5, characterized in that a conversion formula for transducing the pressure in said measuring portion thin tube which has been measured by said pressure measuring means into mass flow rate M(t) of the gaseous fuel flowing in said measuring portion thin tube is represented by:

$$\dot{M}(t) = A \cdot \rho(t) \cdot u(t)$$
$$= \frac{2A}{\kappa-1}\left(\sqrt{\frac{\kappa \cdot \rho_1}{P_1^{1/\kappa}}}\, P(t)^{(\kappa+1)/2\kappa} - \sqrt{\frac{\kappa \cdot \rho_1}{P_1^{(2-\kappa)/\kappa}}}\, P(t)^{1/\kappa}\right) \quad 5$$

(where, A is cross-sectional area (m²) of the measuring portion thin tube, $\rho(t)$ is density (kg/m³) of the gaseous fuel, u(t) is flow velocity (m/sec) of the gaseous fuel, K is specific heat ratio (dimensionless adiabatic coefficient), P(t) is pressure (Pa) in the measuring portion thin tube, $P_1=P(0)$, and $\rho_1=\rho(0)$).

* * * * *